United States Patent
Shiota

(10) Patent No.: US 10,855,867 B2
(45) Date of Patent: Dec. 1, 2020

(54) MEDIUM TRANSPORT APPARATUS, IMAGE READING APPARATUS, AND CONTROL METHOD

(71) Applicant: SEIKO EPSON CORPORATION, Tokyo (JP)

(72) Inventor: Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/279,836

(22) Filed: Feb. 19, 2019

(65) Prior Publication Data

US 2019/0260896 A1 Aug. 22, 2019

(30) Foreign Application Priority Data

Feb. 20, 2018 (JP) ................................. 2018-027870

(51) Int. Cl.
*H04N 1/00* (2006.01)
*B65H 7/06* (2006.01)

(52) U.S. Cl.
CPC ........... *H04N 1/00766* (2013.01); *B65H 7/06* (2013.01); *H04N 1/00684* (2013.01); *H04N 1/00769* (2013.01); *H04N 1/00771* (2013.01); *H04N 1/00774* (2013.01); *H04N 1/00779* (2013.01); *B65H 2511/528* (2013.01); *B65H 2511/529* (2013.01); *B65H 2515/82* (2013.01); *B65H 2557/61* (2013.01); *B65H 2557/63* (2013.01)

(58) Field of Classification Search
None
See application file for complete search history.

(56) References Cited

U.S. PATENT DOCUMENTS

| | | | | |
|---|---|---|---|---|
| 5,594,653 A * | 1/1997 | Akiyama | ............... | G06K 15/00 358/1.15 |
| 7,108,348 B2 * | 9/2006 | Shinkawa | ............ | B41J 2/04581 347/19 |
| 7,349,566 B2 * | 3/2008 | Jones | ................. | G06K 9/00979 382/139 |
| 8,169,602 B2 * | 5/2012 | Jones | .................... | G06Q 20/18 356/71 |

(Continued)

FOREIGN PATENT DOCUMENTS

| | | |
|---|---|---|
| EP | 2708953 A | 3/2014 |
| EP | 2788268 A | 10/2014 |

(Continued)

OTHER PUBLICATIONS

European Search Report issued in Application No. EP19157624 dated Jun. 17, 2019.

*Primary Examiner* — Anh-Vinh T Nguyen
(74) *Attorney, Agent, or Firm* — Workman Nydegger

(57) ABSTRACT

A medium transport apparatus includes a medium transport path through which a medium passes, a path state detection section configured to output a detection value corresponding to a state of the medium transport path, a control section configured to compare the detection value output by the path state detection section with a threshold value for the detection value and determine whether an abnormal condition has occurred in the medium transport path, and a storage configured to store history information including the detection value acquired in the past, in which the control section changes the threshold value based on the history information.

18 Claims, 13 Drawing Sheets

(56) References Cited

U.S. PATENT DOCUMENTS

| | | | |
|---|---|---|---|
| 10,639,885 B2* | 5/2020 | Shinkawa | B41J 2/0451 |
| 2003/0235328 A1* | 12/2003 | Nakamura | B65H 29/62 |
| | | | 382/112 |
| 2005/0154562 A1* | 7/2005 | Matsuura | G06F 11/008 |
| | | | 702/185 |
| 2005/0157327 A1* | 7/2005 | Shoji | G06K 15/408 |
| | | | 358/1.14 |
| 2005/0185973 A1* | 8/2005 | Hama | G03G 15/556 |
| | | | 399/27 |
| 2006/0159471 A1 | 7/2006 | Yasukawa et al. | |
| 2006/0181556 A1* | 8/2006 | Wanibuchi | B41J 11/006 |
| | | | 347/8 |
| 2006/0182451 A1* | 8/2006 | Shoji | G03G 15/55 |
| | | | 399/9 |
| 2008/0107467 A1* | 5/2008 | Fukano | B41J 3/445 |
| | | | 400/610 |
| 2009/0051109 A1* | 2/2009 | Hiroike | B65H 7/06 |
| | | | 271/265.01 |
| 2009/0195844 A1* | 8/2009 | Shiode | B65H 7/04 |
| | | | 358/498 |
| 2009/0214228 A1* | 8/2009 | Ito | G03G 15/70 |
| | | | 399/21 |
| 2010/0073700 A1* | 3/2010 | Uematsu | B41J 25/308 |
| | | | 358/1.13 |
| 2012/0235929 A1 | 9/2012 | Hongo et al. | |
| 2013/0120490 A1* | 5/2013 | Nakajima | B41J 29/393 |
| | | | 347/19 |
| 2013/0155422 A1* | 6/2013 | Kuo | G03G 15/5062 |
| | | | 358/1.2 |
| 2013/0278669 A1* | 10/2013 | Hamamoto | B41J 25/308 |
| | | | 347/19 |
| 2014/0175740 A1 | 6/2014 | Ikeda | |
| 2015/0109628 A1* | 4/2015 | Unno | H04N 1/00092 |
| | | | 358/1.12 |
| 2015/0336381 A1* | 11/2015 | Kyoso | B41J 2/0451 |
| | | | 347/14 |
| 2018/0141358 A1* | 5/2018 | Akizuki | B41J 29/38 |
| 2019/0263112 A1* | 8/2019 | Shinkawa | B41J 2/16579 |

FOREIGN PATENT DOCUMENTS

| | | |
|---|---|---|
| JP | 2006-193286 A | 7/2006 |
| JP | 2012-193040 A | 10/2012 |
| JP | 2017-039589 A | 2/2017 |

* cited by examiner

MEDIUM TRANSPORT APPARATUS, IMAGE READING APPARATUS, AND CONTROL METHOD

BACKGROUND

1. Technical Field

The present invention relates to a medium transport apparatus for transporting a medium, an image reading apparatus including the medium transport apparatus, and a method of controlling the medium transport apparatus.

2. Related Art

Hereinafter, an example scanner will be described as an example image reading apparatus. Some scanners include an auto document feeder (ADF) for automatically feeding documents, and such an auto document feeder can automatically feed and read a plurality of sheets of documents.

During the document transporting operation in a document transport path in an image reading apparatus, unexpected abnormal conditions may occur if stapled documents are transported or documents with wrinkles, damages, or attachments are transported. Such abnormal conditions can affect the read images and, in the worst case, the documents and the apparatus can be damaged. Examples of the document transport abnormal conditions include multi-sheet feeding, skewing, and jamming. To detect such document transport abnormal conditions, in some methods, whether a detection value exceeds a threshold value is determined by using a detector that outputs a detection value corresponding to a state change in transporting a document and when the detection value exceeds the threshold value, it is determined that an abnormal condition has occurred. For example, a known method uses transmittance of ultrasonic waves as a detection value for multi-sheet feed detection, uses a difference between passage timings of a right leading edge and a left leading edge of a document as a detection value for skew detection, and uses sound as a detection value for jam detection. As an example technique, JP-A-2012-193040 detects a sound produced in a document transport path by using a microphone and detects an occurrence of a document jam based on a reference value (also may be referred to as a threshold value) for the intensity of sound and a reference value for the duration of sound. JP-A-2017-039589 discloses a technique for determining whether two or more sheets are being fed in an overlapping state based on a reception signal obtained from an ultrasonic wave receiver and a threshold value.

The example methods of detecting a jam using a sound produced in a document transport path determine whether a jam has occurred by determining whether a detected sound exceeds a predetermined threshold value or not. However, various sounds are produced in the document transport path depending on, for example, the paper quality and the use environment, and thus the sounds can be erroneously determined to be a jam even though such a condition is not a jam. To solve the problem, the threshold value may be changed depending on the paper quality of a document and the use environment. However, leaving such setting change to users impairs the usability of the apparatuses. Furthermore, a dedicated sensor for detecting the paper quality of a document and the use environment substantially increases the cost of the apparatus.

SUMMARY

An advantage of some aspects of the invention is that it provides a medium transport apparatus that determines an abnormal condition based on a detection value and a threshold value with more appropriate abnormal condition determination and further increased usability is provided while suppressing cost increase.

A medium transport apparatus according to an aspect of the invention includes a medium transport path through which a medium passes, a path state detection section configured to output a detection value corresponding to a state of the medium transport path, and a control section configured to compare the detection value output by the path state detection section with a threshold value for the detection value and determine whether an abnormal condition has occurred in the medium transport path, in which the control section changes the threshold value based on history information including the detection value acquired in the past.

In this aspect, the control section has a function of changing the threshold value based on the history information including the detection value acquired in the past, that is, a function of optimizing the threshold value. Accordingly, more appropriate abnormal condition determination and further increased usability can be provided. Furthermore, a dedicated sensor is not required in changing the threshold value, and thus cost increase of the apparatus can be suppressed. The information about the detection value is not limited to the detection value itself, and includes any information about the detection value such as the detection value itself, a value obtained by processing the detection value, and information (for example, high, low, etc.) that indicates the magnitude of the detection value. At least one of the information is included in the history information.

It is preferable that, when a difference between an average value of a plurality of the detection values acquired in the past and the threshold value increases, the control section lower the threshold value, and when the difference between the average value and the threshold value decreases, the control section raise the threshold value.

In this case, when a difference between an average value of a plurality of the detection values acquired in the past and the threshold value increases, the control section lowers the threshold value (increases the sensitivity), and when the difference between the average value and the threshold value decreases, the control section raises the threshold value (decreases the sensitivity). Consequently, the threshold value can be set to a value appropriate for the medium actually being transported and the use environment of the apparatus, thus more appropriate abnormal condition determination can be provided.

It is preferable that, when the acquired detection value is less than or equal to a reference value that is to be updated, the control section subtract a predetermined percentage of a difference between the acquired detection value and the reference value from the reference value to obtain a new reference value and add a predetermined margin value to the reference value to obtain the threshold value, and when the acquired detection value is higher than the reference value, the control section add the predetermined percentage of the difference between the acquired detection value and the reference value to the reference value to obtain a new reference value and add the margin value to the reference value to obtain the threshold value. In this case, the threshold value can be changed to a value appropriate for the medium actually being transported and the use environment of the apparatus, thus more appropriate abnormal condition determination can be provided.

It is preferable that the medium transport apparatus further include a display section configured to display information, in which, when the detection value is higher than the threshold value and the control section determines that an abnormal condition has occurred in the medium transport path, the control section cause the display section to display a user interface for urging a user to check whether the determination is true or false and acquire the information about whether the determination is true or false.

In this case, when the detection value is higher than the threshold value and the control section determines that an abnormal condition has occurred in the medium transport path, the control section causes the display section to display a user interface for urging a user to check whether the determination is true or false and acquires the information about whether the determination is true or false. Consequently, the threshold value can be changed to a more appropriate value based on the information about whether the determination is true or false, and thus more appropriate abnormal condition determination can be provided.

It is preferable that, the control section do not include the detection value acquired when the determination is true in the history information. The detection value acquired when the determination is true can be considered to be an outlier when an abnormal condition has occurred, and if such a value is included in the history information, an appropriate threshold value may not be provided for the medium actually being transported. In this case, the control section does not add the detection value acquired when the determination is true to the history information and thereby the threshold value can be more appropriately changed, and thus more appropriate abnormal condition determination can be provided.

It is preferable that the history information include the information about whether the determination is true or false, and the control section do not use a value that is greater than or equal to the detection value acquired when the determination is true as the threshold value.

The detection value acquired when the determination is true is a value acquired when an abnormal condition has actually occurred in the medium transport path. If a value greater than or equal to the detection value is used as the threshold value, the control section can determine no abnormal condition has occurred even though an abnormal condition has actually occurred. In this case, the control section does not use a value that is greater than or equal to the detection value acquired when the determination is true as the threshold value, and thus the above-described misdetection can be reduced or prevented.

It is preferable that, the history information include the information about whether the determination is true or false, the control section calculate a frequency of occurrence of the false determinations, and when the occurrence frequency is less than or equal to a set lower limit, the control section lower the threshold value and when the occurrence frequency is greater than or equal to a set upper limit, the control section raise the threshold value.

The state in which the determination false occurrence frequency is less than or equal to a set lower limit means that misdetection does not occur so much, that is, the threshold value being applied is too high (the detection sensitivity is too low). In such a case, the control section lowers the threshold value (increases the detection sensitivity), and thus an abnormal condition in the medium transport path can be more reliably detected. On the other hand, the state in which the determination false occurrence frequency is greater than or equal to a set upper limit means that misdetection occurs many times, that is, the threshold value being applied is too low (the detection sensitivity is too high). In such a case, the control section raises the threshold value (decreases the detection sensitivity), and thus misdetection can be suppressed.

It is preferable that, when the occurrence frequency is greater than or equal to the set upper limit, the control section set the threshold value as a minimum threshold value and do not set a threshold value less than or equal to the minimum threshold value in the subsequent processing.

The state the occurrence frequency becomes greater than or equal to the set upper limit means that misdetection occurs many times as described above and the threshold value being applied is too low (the detection sensitivity is too high). In such a case, if the threshold value is used again, misdetection can occur many times again. In this case, when the occurrence frequency becomes greater than or equal to the set upper limit, the control section sets the threshold value as a minimum threshold value and in the subsequent processing, sets no threshold value that is less than or equal to the minimum threshold value to prevent frequent misdetection.

It is preferable that, when the occurrence frequency is not lower than a preset allowable frequency even though the minimum threshold value has been set as the threshold value, the control section do not perform the operation for determining whether an abnormal condition has occurred.

When the occurrence frequency is not lower than a preset allowable frequency even though the minimum threshold value has been set as the threshold value, it can be determined that some kind of abnormal condition has occurred in the detection section. In this case, in such a case, the control section does not perform the operation for determining whether an abnormal condition has occurred, and thus the apparatus can be continuously used.

It is preferable that, when the control section determine that an abnormal condition has occurred two consecutive times, in the first determination of an occurrence of an abnormal condition, the control section do not display the user interface on the display section and in the second determination of an occurrence of an abnormal condition, the control section provide the user interface on the display section.

If the control section determines that an abnormal condition has occurred two consecutive times, the determinations are probably false, whereas, if the control section determined that an abnormal condition occurred, and before the determination, did not determined that an abnormal condition occurred, and after the determination, does not determine that an abnormal condition has occurred, these determinations are probably true. In this case, when the control section determines that an abnormal condition has occurred two consecutive times, in the first determination of an occurrence of an abnormal condition, the control section does not provide the user interface on the display section and in the second determination of an occurrence of an abnormal condition, the control section provides the user interface on the display section. Consequently, a user can be prevented from unnecessarily checking the determination when an abnormal condition occurs first.

It is preferable that the control section reset the history information in accordance with an instruction by a user or when a predetermined condition is satisfied. In this case, since the control section resets the history information in accordance with an instruction by a user or when a predetermined condition is satisfied, for example, when the use environment is changed, the history information is reset and thereby more appropriate abnormal condition determination can be provided.

It is preferable that, the path state detection section detect a change in a sound in the medium transport path and the detection value indicate the intensity of the sound, and when the detection value is higher than the threshold value, the control section determine that a jam as the abnormal condition has occurred.

In this case, the path state detection section detects a change in a sound in the medium transport path and the detection value indicates the intensity of the sound, and when the detection value is higher than the threshold value, the control section determines that a jam as the abnormal condition has occurred. With this configuration, some of the above-described operational effects can be achieved.

According to another aspect of the invention, an image reading apparatus includes a reading section configured to read a medium, and any one of the above-described medium transport apparatuses, the medium transport apparatus being configured to transport the medium to the reading section.

According to still another aspect of the invention, a method of controlling a threshold value in a medium transport apparatus including a medium transport path through which a medium passes, a path state detection section configured to output a detection value corresponding to a state of the medium transport path, a control section configured to compare the detection value output by the path state detection section with a threshold value for the detection value and determine whether an abnormal condition has occurred in the medium transport path, and a display section configured to display information is provided. The method includes changing the threshold value based on the history information including the detection value acquired in the past.

In this case, the control method includes changing the threshold value based on the history information including the detection value acquired in the past, that is, a process of optimizing the threshold value. Consequently, more appropriate abnormal condition determination and further increased usability can be provided. Furthermore, a dedicated sensor is not required in changing the threshold value, and thus cost increase of the apparatus can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A medium transport apparatus and an image reading apparatus according to an embodiment of the invention and a control method according to an embodiment of the invention will be described with reference to the attached drawings. In this embodiment, as an example image reading apparatus, a document scanner (hereinafter, simply referred to as a scanner LA) that can read an image on at least one of the front surface and the back surface of a document (hereinafter, referred to as a document P), which is an example medium, will be described.

Figure 1:
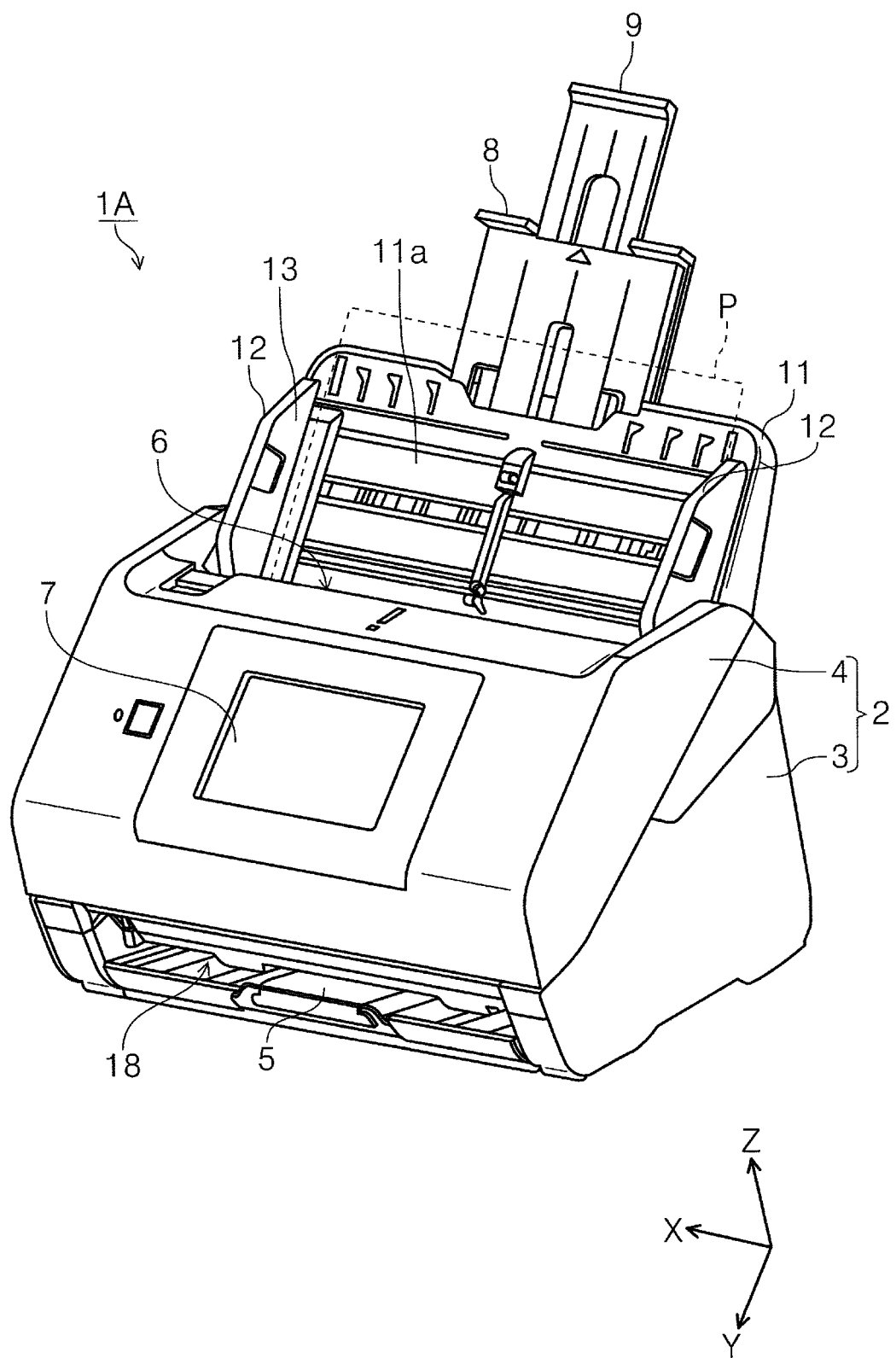
FIG. 1 is an external perspective view of a scanner according to an embodiment of the invention.
Figure 2:
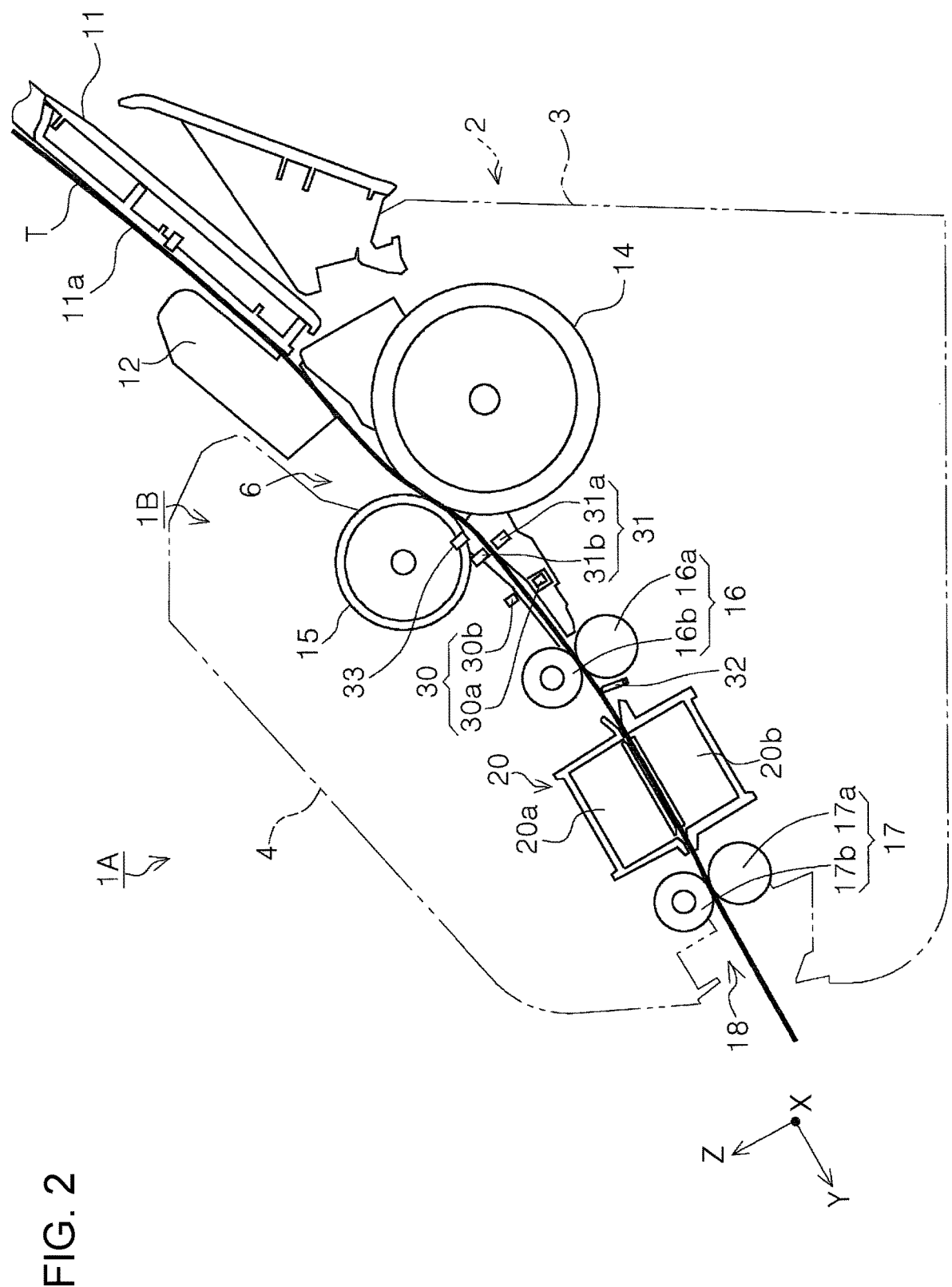
FIG. 2 is a side cross-sectional view of a document transport path in a scanner according to an embodiment of the invention.

In an X-Y-Z coordinate system in FIG. 1 and FIG. 2, an X direction denotes an apparatus width direction and a Y direction denotes a document transport direction. A Z direction intersects the Y direction and is approximately orthogonal to a surface of a document to be transported. Furthermore, a +Y direction side denotes an apparatus front side, and a -Y direction side denotes an apparatus back side. A left side viewed from the apparatus front side denotes a +X direction, and a right side denotes a -X direction. A +Z direction side denotes an apparatus upper side (including upper sections, upper surfaces, and the like), and a -Z direction side denotes an apparatus lower side (including lower sections, lower surfaces, and the like). A direction (+Y direction side) toward which a document P is transported denotes "downstream" and the opposite direction (-Y direction side) denotes "upstream".

Overview of Scanner

Hereinafter, the scanner 1A, which is an example image reading apparatus according to the embodiment of the invention, will be described mainly with reference to FIG. 1. FIG. 1 is an external perspective view of the scanner 1A according to the embodiment of the invention. The scanner 1A has an apparatus body 2 that includes in it a reading section 20 (FIG. 2) for reading an image on a document P. The apparatus body 2 includes a lower unit 3 and an upper unit 4. The upper unit 4 is openably and closably attached to the lower unit 3 so as to be rotated about its downstream side in a document transport direction as a rotation axis with respect to the lower unit 3. The upper unit 4 can be rotated and opened toward the apparatus front side so as to expose a document transport path of a document P for a user to readily fix a jam of the document P.

A document mounting section 11 that has a mounting surface 11a, on which a document P to be fed can be mounted, is provided on the apparatus back side of the apparatus body 2. The document mounting section 11 can be detachably attached to the apparatus body 2. The document mounting section 11 is provided with a pair of left and right edge guides 12 for guiding side edges of a document P in the width direction (the X-axis direction) that intersects the feeding direction (the Y-axis direction) of the document P.

The document mounting section 11 has a first paper support 8 and a second paper support 9. The first paper support 8 and the second paper support 9 can be stored inside the document mounting section 11 and can be pulled out from the document mounting section 11 as illustrated in FIG. 1 such that the length of the mounting surface 11a can be adjusted.

The apparatus body 2 has an operation panel 7 on the apparatus front side of the upper unit 4. On the operation panel 7, a user interface (UI) for setting various settings for reading, for executing a reading operation, for displaying reading setting contents, or the like is displayed. The operation panel 7 is a touch panel through which both of a displaying operation and an inputting operation can be performed. The operation panel 7 serves as an operation section for performing various operations and a display section for displaying various information. A feed port 6 that is connected to the inside of the apparatus body 2 is provided in an upper portion of the upper unit 4. A document P mounted on the document mounting section 11 is fed from the feed port 6 toward a reading section 20 provided in the apparatus body 2. A discharge tray 5 for receiving a discharged document P is provided on the apparatus front side of the lower unit 3.

Document Transport Path in Scanner

A document transport apparatus 1B according to the embodiment of the invention, that is, a document transport path in the scanner 1A will be described mainly with reference to FIG. 2. FIG. 2 is a side cross-sectional view of a document transport path in the scanner 1A according to the embodiment. The scanner 1A includes the document transport apparatus 1B. The document transport apparatus 1B includes components (path forming members and rollers) for transporting documents in the scanner 1A. From another point of view, the document transport apparatus 1B can serve as an apparatus that has the functions of the scanner A1 except a document reading function (a reading section 20, which will be described below). Alternatively, from another point of view in transporting documents, the scanner 1A itself can be a document transport apparatus even though the scanner 1A has the function (the reading section 20, which will be described below) of reading documents. In FIG. 2, the solid line indicated by a reference numeral T indicates a document transport path, that is, a trajectory of a document P. The document transport path T is a space defined by the lower unit 3 and the upper unit 4.

The document mounting section 11 is disposed on the most upstream side of the document transport path T. On the downstream side of the document mounting section 11, a feeding roller 14 for feeding a document P mounted on the mounting surface 11a of the document mounting section 11 toward the reading section 20 and a separation roller 15 for nipping the document P with the feeding roller 14 and separating the document P are disposed.

The feeding roller 14 comes into contact with a lowermost document P of documents P mounted on the mounting surface 11a of the document mounting section 11. Accordingly, when a plurality of documents P are set on the document mounting section 11 in the scanner 1A, the documents P are fed sequentially from the document P on the side of the mounting surface 11a toward the downstream side. To the document mounting section 11, a sensor (not illustrated) for detecting whether a document P is mounted on the document mounting section 11 is provided.

Figure 3:
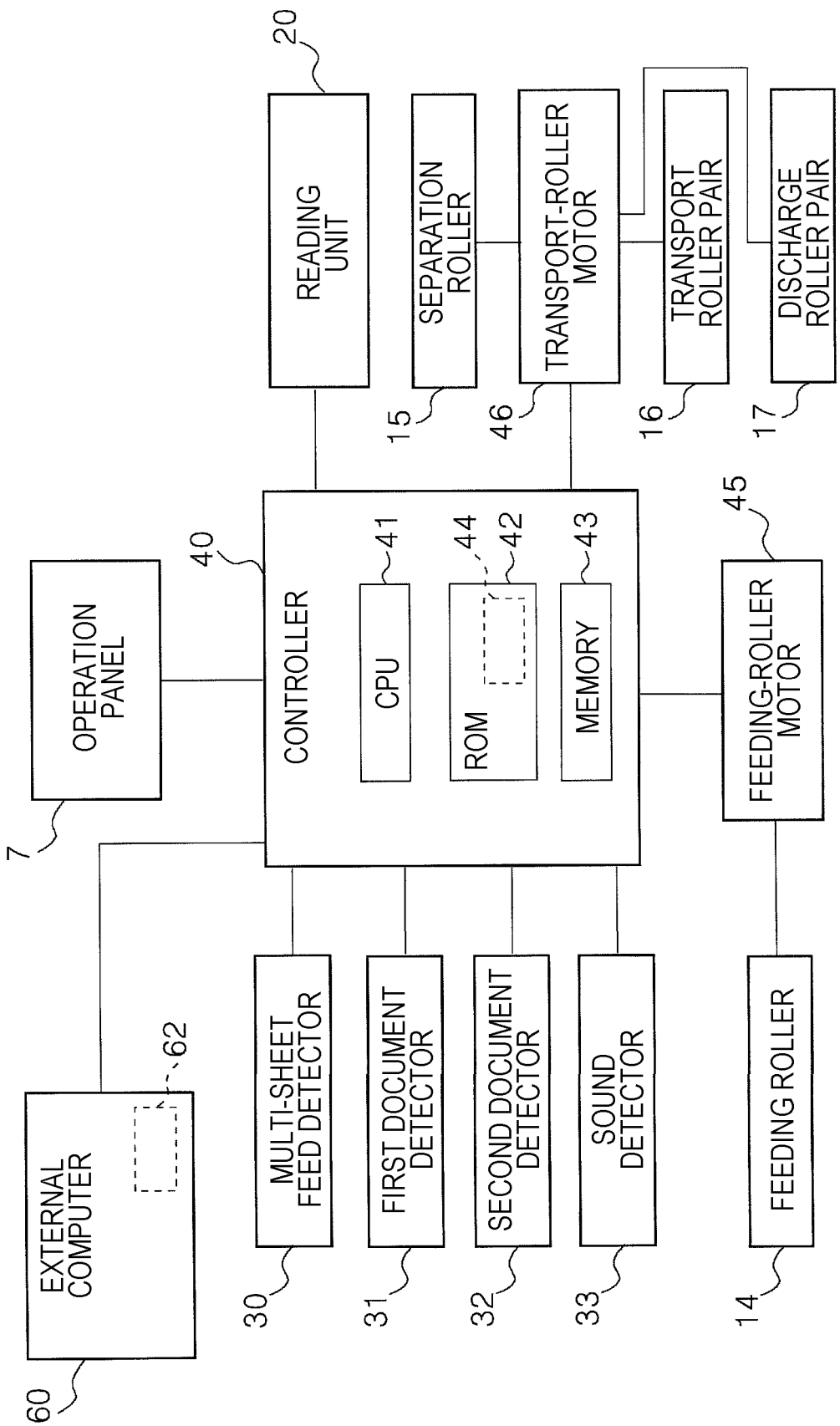
FIG. 3 is a block diagram of a control system in a scanner according to an embodiment of the invention.

The feeding roller 14 is driven and rotated by a feeding-roller motor 45 (FIG. 3). With the rotation torque from the feeding-roller motor 45, the feeding roller 14 rotates in the counterclockwise direction in FIG. 2. To the separation roller 15, rotation torque is transmitted from a transport-roller motor 46 (FIG. 3) via a torque limiter (not illustrated).

When no document P is provided or only a sheet of document P is provided between the feeding roller 14 and the separation roller 15, the separation roller 15 is rotated (in the clockwise direction in FIG. 2) due to the slipping in the torque limiter (not illustrated) against the rotation torque from the transport-roller motor 46. When a second document P and subsequent documents P are further provided between the feeding roller 14 and the separation roller 15 onto the document P to be fed, slipping occurs between the documents, and thus the separation roller 15 rotates in the counterclockwise direction in FIG. 2 with the torque from the transport-roller motor 46. This prevents or reduces multi-sheet feeding of the documents P.

A transport roller pair 16, the reading section 20 for reading images, and a discharging roller pair 17 are disposed on the downstream side of the feeding roller 14. The transport roller pair 16 includes a transport driving roller 16a that is driven to rotate by the transport-roller motor 46 (FIG. 3) and transport driven roller 16b that is rotated. A document P nipped by the feeding roller 14 and the separation roller 15 and fed to the downstream side is nipped by the transport roller pair 16 and transported to the reading section 20 that is disposed on the downstream side of the transport roller pair 16.

A sound detector 33 that detects a sound generated in a document transport path T is disposed near the nipping position between the feeding roller 14 and the separation roller 15, more specifically, slightly downstream side of the nipping position. The sound detector 33 is a microphone that converts a sound into an electrical signal and sends the signal to a controller 40 (FIG. 3) that serves as a control section. The sound detector 33 is an example path state detection section that outputs a detection value that varies in accordance with a state change in the document transport path T. The sound detector 33 detects a sound in the document transport path T and converts the sound into an electrical signal. An example state change in the document transport path T, in this embodiment, is a jam of a document P; however, this is a mere example and for example, the state change in the document transport path T includes skewing of a document P. In this embodiment, the detection values that vary in accordance with such a state change are the intensity of sound; however, this is a mere example and for example, when values of a driving current for the feeding-roller motor 45 (FIG. 3) or the transport-roller motor 46 (FIG. 3) vary due to a jam of a document P, the values may be used as the detection values, and in such a case, as an example, a control circuit for the motor serves as the path state detection section. Alternatively, when vibrations occur in the document transport path T due to a jam of a document P, the vibrations can be used as the detection values and in such a case, for example, a vibration sensor serves as the path state detection section. As described above, state changes in the document transport path T include various changes and the path state detection section that outputs detection values in accordance with the state changes includes various devices.

On the downstream side of the sound detector 33, a first document detector 31 is disposed. The first document detector 31 is, for example, an optical sensor that includes a light emitting unit 31a and a light receiving unit 31b that face each other across the document transport path T. The light receiving unit 31b sends an electrical signal that indicates the intensity of a detection light to the controller 40 (FIG. 3). A document P being transported interrupts the detection light emitted from the light emitting unit 31a and changes the electrical signal indicating the intensity of the detection light. By the signal change, the controller 40 can detect the passage of a leading edge or a trailing edge of the document P.

On the downstream side of the first document detector 31, a multi-sheet feed detector 30 that detects multi-sheet feeding of documents P is disposed. The multi-sheet feed detector 30 includes an ultrasonic transmitter 30a and an ultrasonic receiver 30b for receiving ultrasonic waves that face each other across the document transport path T. The ultrasonic receiver 30b sends an electrical signal that indicates the intensity of detected ultrasonic waves to the controller 40 (FIG. 3). When multi-sheet feeding of documents P occurs, the electrical signal indicating the intensity of ultrasonic waves changes and by the electric signal change, the controller 40 can detect the multi-sheet feeding of the documents P.

On the downstream side of the multi-sheet feed detector 30, a second document detector 32 is disposed. The second document detector 32 is a contact sensor that has a lever. In response to passage of a leading edge or a trailing edge of a document P, the lever rotates and the electrical signal to be sent from the second document detector 32 to the controller 40 (FIG. 3) changes. This signal change enables the controller 40 to detect the passage of the leading edge or the trailing edge of the document P. The controller 40 can determine the location of the document P in the document transport path T with the above-described first document detector 31 and the second document detector 32.

The reading section 20, which is disposed on the downstream side of the second document detector 32, includes an upper read sensor 20a that is provided on the side of the upper unit 4 and a lower read sensor 20b that is provided on the side of the lower unit 3. In this embodiment, as an example, the upper read sensor 20a and the lower read sensor 20b are configured as a contact image sensor (CIS) module.

After an image on at least one of the front side and the back side of a document P has been read in the reading section 20, the document P is nipped by the discharging roller pair 17 that is disposed on the downstream side of the reading section 20 and discharged from a discharge port 18 that is provided on the apparatus front side of the lower unit 3. The discharging roller pair 17 includes a discharge driving roller 17a that is driven to rotate by the transport-roller motor 46 (FIG. 3) and discharge driven roller 17b that is rotated.

Control System in Scanner

Hereinafter, a control system in the scanner 1A and the document transport apparatus 1B will be described with reference to FIG. 3. FIG. 3 is a block diagram of a control system in the scanner 1A according to the embodiment. In FIG. 3, the controller 40 that serves as the control section controls feeding and reading of a document P and various processing in the scanner 1A and the document transport apparatus 1B. To the controller 40, a signal is input from the operation panel 7, and from the controller 40, a signal for display on the operation panel 7, specifically, a signal for implementing a user interface (UI) is sent to the operation panel 7. The controller 40 controls the feeding-roller motor 45 and the transport-roller motor 46. As described above, the feeding-roller motor 45 is a drive source for the feeding roller 14, and the transport-roller motor 46 is a drive source for the separation roller 15, the transport roller pair 16, and the discharging roller pair 17. To the controller 40, read data is input from the reading section 20 and from the controller 40, a signal for controlling the reading section 20 is sent to the reading section 20. To the controller 40, signals from the multi-sheet feed detector 30, the first document detector 31, the second document detector 32, and the sound detector 33 are also input.

The controller 40 includes a central processing unit (CPU) 41, a read-only memory (ROM) 42, and a memory 43. The CPU 41 performs various arithmetic processing in accordance with a program 44 stored in the ROM 42 and performs overall operational control of the scanner 1A. The memory 43, which is an example storage, is a readable and writable nonvolatile memory and stores various data necessary for jam determination, which will be described below. When not specifically described in this specification, parameters necessary for jam determination, such as a detection value and a threshold value described below, parameters necessary for threshold optimization, and the like are all stored in the memory 43, and the values are updated by the controller 40 as necessary. The program 44 stored in the ROM 42 may be a single program or may be a plurality of programs including a program for determining a jam in the document transport path T, a program (a program according to the embodiment) for optimizing a threshold value described below, a program (a program according to the embodiment) for controlling a UI displayed on the operation panel 7, various control programs necessary for transporting and reading documents, and the like.

The scanner 1A can be connected to an external computer 60, and information is input from the external computer 60 to the controller 40. The external computer 60 includes a display section 62. A user interface (UI) is implemented on the display section 62 by a control program stored in a storage (not illustrated) in the external computer 60.

Jam Determination Optimization

Figure 4:
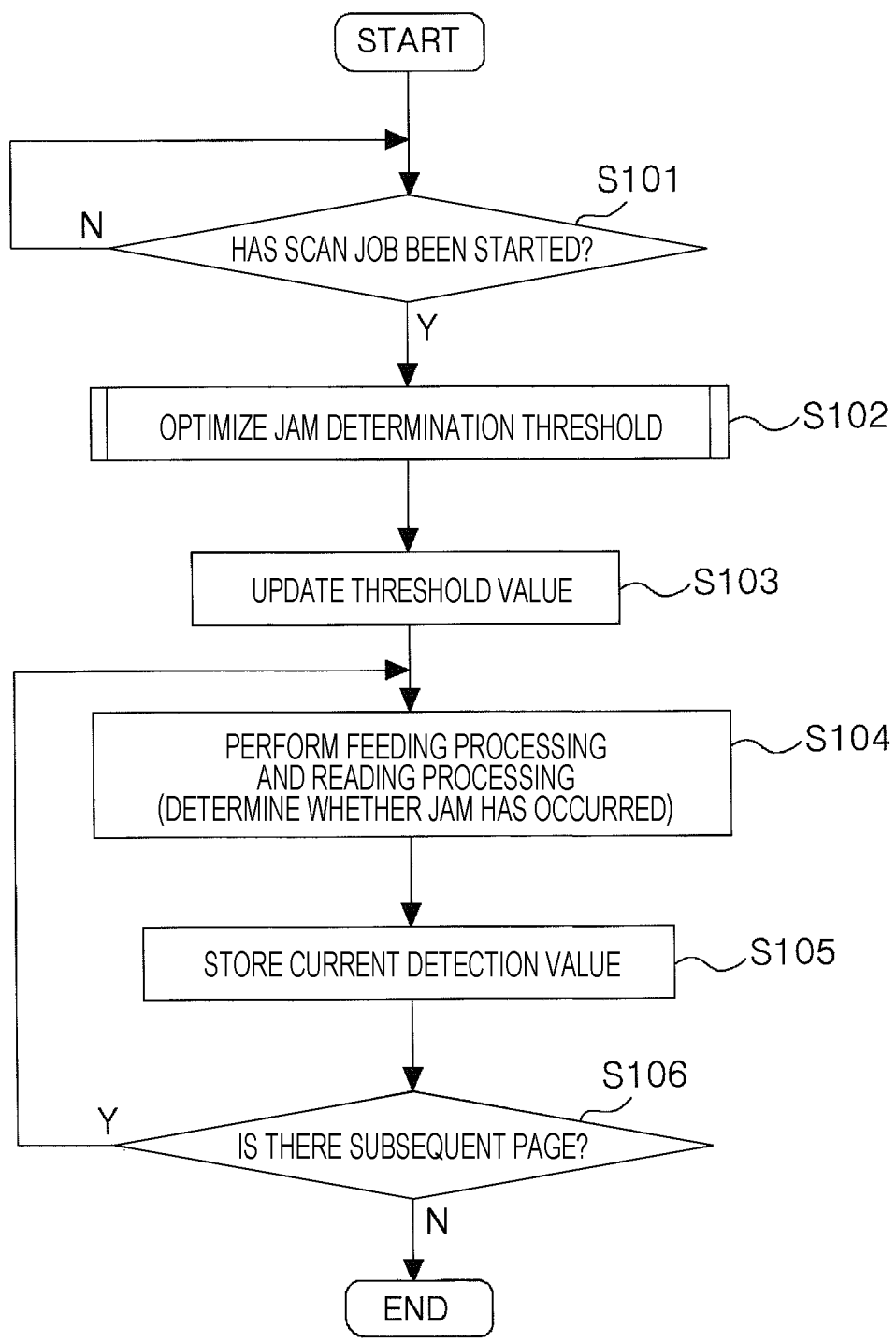
FIG. 4 is a flowchart illustrating a flow of jam determination.

Optimization processing of jam determination by the controller 40 will be described with reference to FIG. 4 and subsequent drawings. First, an overall flow of the jam determination will be described with reference to FIG. 4. FIG. 4 is a flowchart illustrating an overall flow of the jam determination control. In response to a start of a scan job from a standby state (YES in step S101), the controller 40 optimizes a jam determination threshold value (step S102), updates the jam determination threshold value, that is, stores the optimized jam determination threshold value in the memory 43 (FIG. 3) (step S103), and feeds and reads a document by using the optimized jam determination threshold value (step S104).

The controller 40 performs the jam determination in the document feeding and reading processing. The controller 40 stores the current detection value in the memory 43 (FIG. 3), which is an example storage (step S105). The "detection value" indicates the intensity of a sound detected by the sound detector 33 and can be obtained at least one for each document that has been fed and read. For example, the detection value may be an average value or a maximum value of a plurality of detection values acquired at predetermined time intervals during transport of one document, or may be a value acquired at a certain timing. When there is a subsequent page (YES in step S106), the controller 40 repeats the processing in step S104 and step S105.

Figure 5:
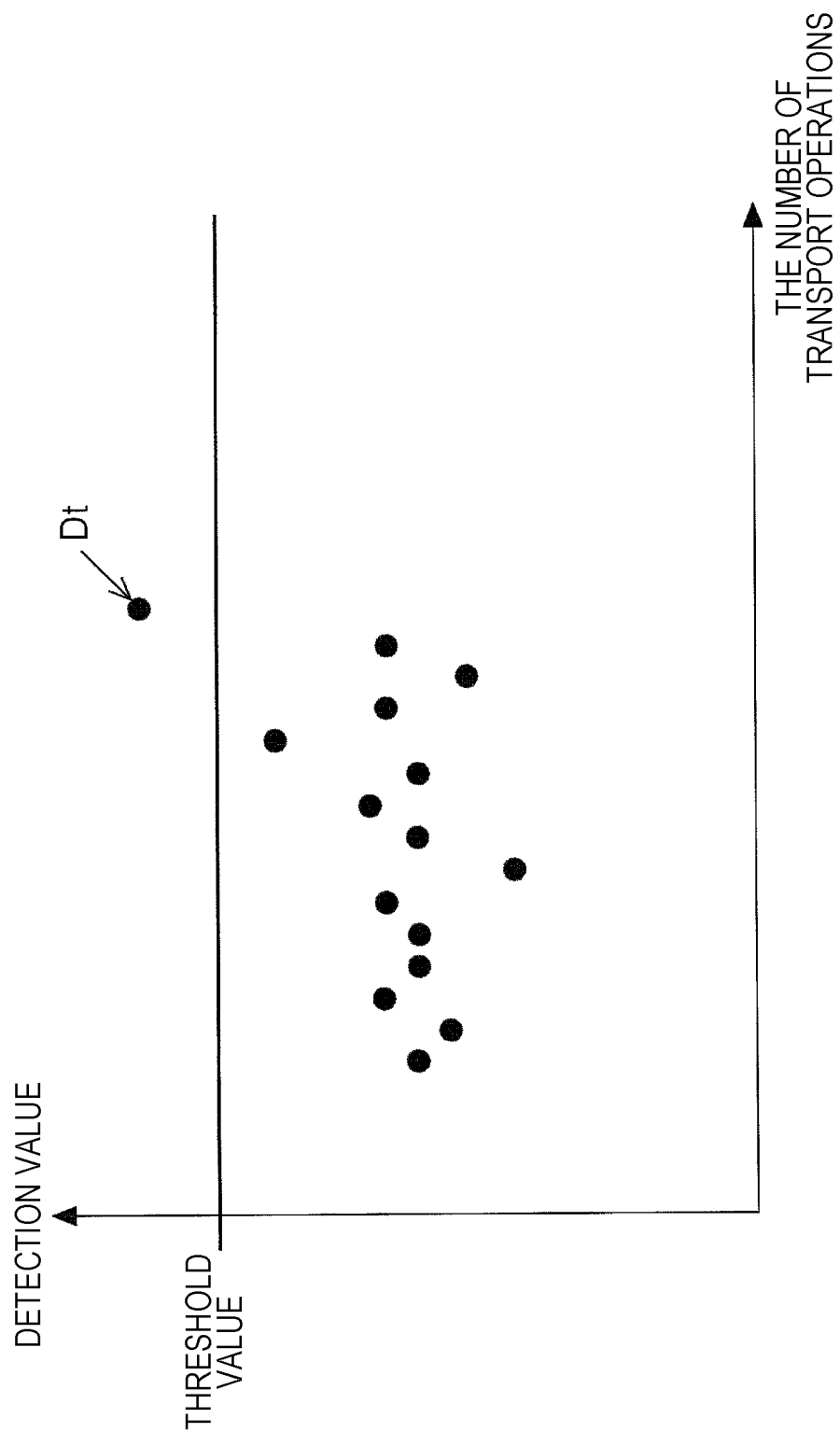
FIG. 5 is a plot of a basic method of jam determination.

FIG. 5 is a plot of detection values in accordance with a basic method of jam determination, in which the vertical axis indicates the intensity (magnitude) of a value detected by the sound detector 33, the horizontal axis indicates the number of transport operations (the number of documents), and a black circle plot indicates a detection value. One plot corresponds to one document. This also applies to FIG. 6, FIG. 7, FIG. 9, and FIG. 12 used in the following description. When a jam occurs, a high detection value is output, and accordingly, when a detection value exceeds a threshold value, it is determined that a jam has occurred. The threshold value is stored in the memory 43 (FIG. 3) as described above and is rewritable. In FIG. 5, a detection value Dt is higher than the threshold value, and the controller 40 determines that a jam has occurred and stops the feeding-roller motor 45 (FIG. 3) and the transport-roller motor 46 (FIG. 3). Then, a warning message, for example, "A document jam has been detected. Check the document jam condition and select processing." is displayed on the operation panel 7.

However, depending on the paper quality of the document P, the use environment (temperature, humidity, altitude, and the like) of the scanner 1A, and other factors, various detection values are output. For example, a large sound is produced when thin paper having wrinkles passes through the document transport path T, and in such a case, the controller 40 can erroneously determine that a jam has occurred even though no jam has occurred. To solve the problem, the threshold value may be changed depending on the paper quality of the document P, the use environment of the scanner 1A, or the like. However, leaving such setting change to a user impairs the usability of the apparatus. Furthermore, a dedicated sensor for detecting the paper quality of a document and a use environment of the scanner 1A substantially increases the cost of the apparatus. To solve the problems, the controller 40 changes a threshold value based on history information including information about a detection value acquired in the past. In other words, the controller 40 optimizes a threshold value based on the history information including information about a detection value acquired in the past. The program 44 that is stored in the ROM 42 (FIG. 3) implements such a function.

Threshold Optimization Method 1

Figure 6:
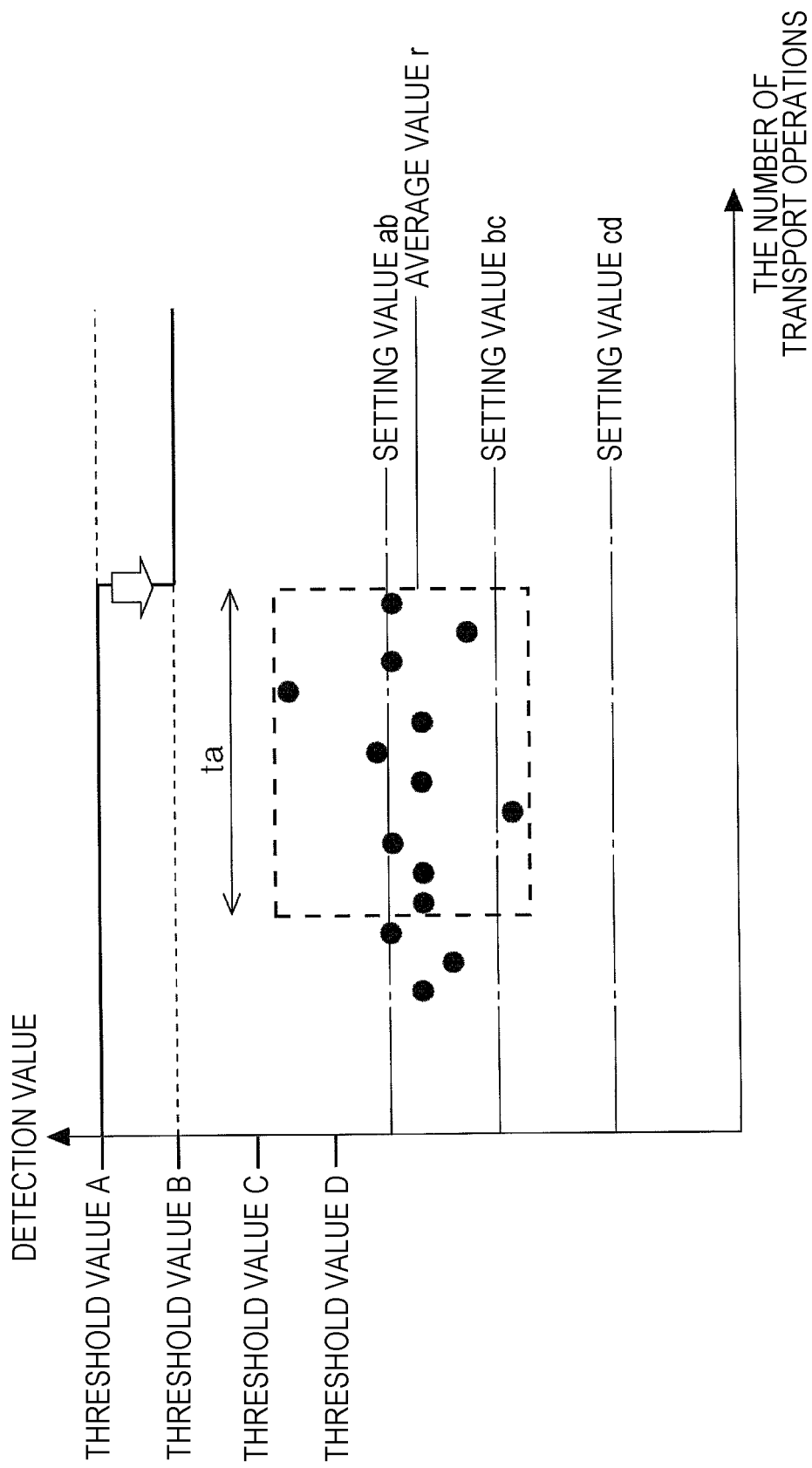
FIG. 6 is a plot of values detected by a threshold optimization method according to a first embodiment.
Figure 7:
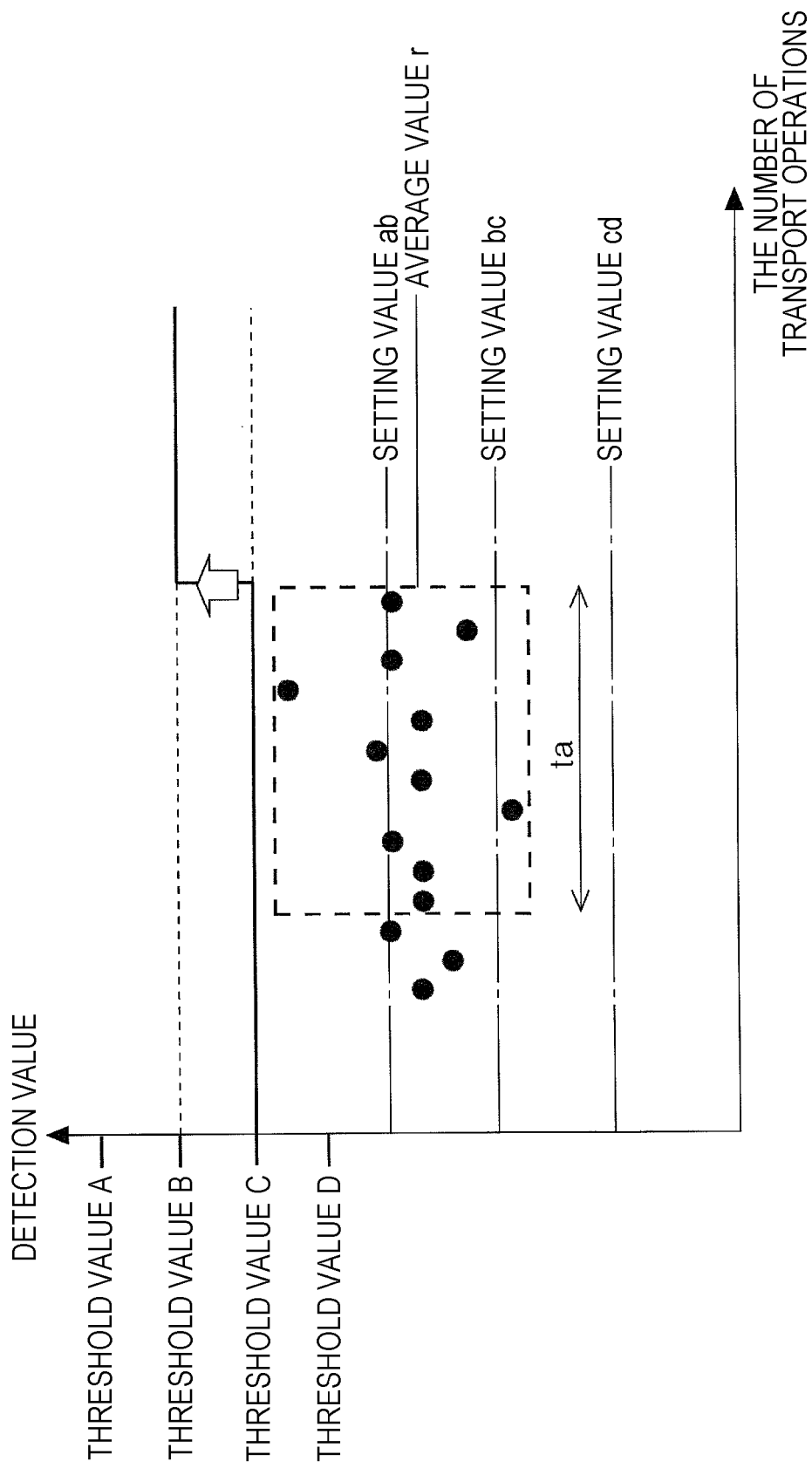
FIG. 7 is a plot of values detected by the threshold optimization method according to the first embodiment.
Figure 8:
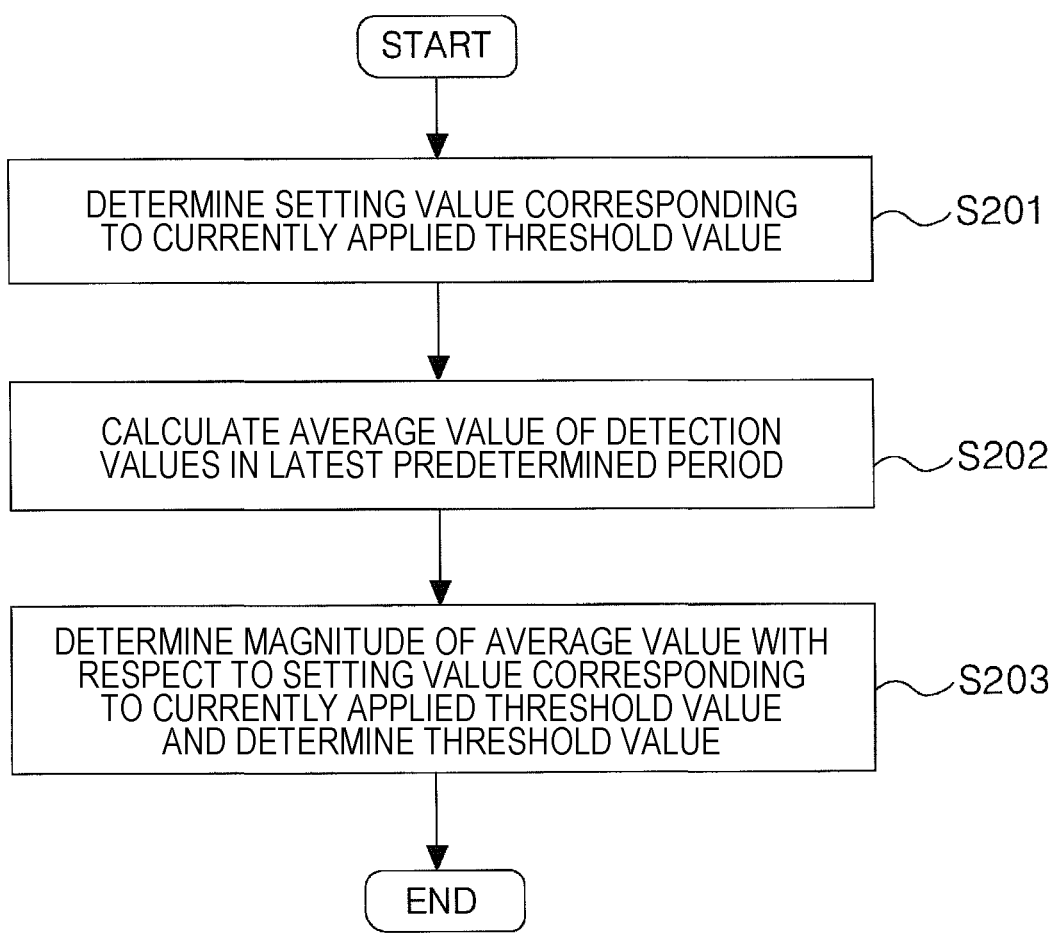
FIG. 8 is a flowchart illustrating outline of the threshold optimization method according to the first embodiment.

FIG. 6 and FIG. 7 are plots of detection values according to a method of optimizing a threshold value based on history information including information about a detection value acquired in the past according to a first embodiment. FIG. 8 is a flowchart of the method. In the threshold optimization method according to the embodiment, first, a setting value that corresponds to a currently applied threshold value is determined as illustrated in FIG. 8 (step S201), an average value of detection values in a latest predetermined period is calculated (step S202), the magnitude of the average value corresponding to the setting value corresponding to the currently applied threshold value is determined and a threshold value is determined (step S203). Hereinafter, the processing is described in detail with reference to FIG. 6 and FIG. 7.

Example threshold values for the jam determination includes four threshold values A, B, C, and D. A setting value ab is a determination value for determining whether to apply the threshold value A. Similarly, a setting value bc is a determination value for determining whether to apply the threshold value B, and a setting value cd is a determination value for determining whether to apply the threshold value C. In this embodiment, the history information includes a detection value and a currently applied threshold value (latest threshold value), and information necessary for optimizing the threshold value includes an average value of a plurality of detection values, the threshold values A to D, and the setting values ab, bc, and cd.

In FIG. 6, it is assumed that the threshold value A is initially applied. During document transport with the threshold value A, when an average value r of detection values in a latest predetermined period ta falls below the setting value ab, the controller 40 lowers a threshold value to be applied from the threshold value A to the threshold value B as indicated by the arrow. In other words, the controller 40 determines whether the latest detection value has a margin with respect to the threshold value. When the controller 40 determines that the latest detection value has a margin, the controller lowers the threshold value, that is, optimizes the threshold value based on the detection values acquired in the past. When the average value r of the detection values in the latest predetermined period ta is equal to or greater than the setting value ab, the controller 40 continues to apply the threshold value A.

In FIG. 7, it is assumed that the threshold value C is initially applied. During document transport with the threshold value C, when an average value r of detection values in the latest predetermined period ta exceeds the setting value bc, the controller 40 raises a threshold value to be applied from the threshold value C to the threshold value B as indicated by the arrow. In other words, the controller 40 determines whether the latest detection value has a margin with respect to the threshold value. When the controller 40 determines that the latest detection value has no margin, the controller 40 raises the threshold value, that is, optimizes the threshold value based on detection values acquired in the past.

The above-described threshold optimization method is summarized as follows. When a setting value corresponding to the threshold value A is the setting value ab and the threshold value A is applied, if the average value r in the latest predetermined period ta is greater than or equal to the setting value ab, the threshold value A is continuously used and if the average value r is less than the setting value ab, the threshold value A is lowered to the threshold value B. When a setting value corresponding to the threshold value B is the setting value bc and the threshold value B is applied, if the average value r in the latest predetermined period ta is greater than or equal to the setting value bc and less than the setting value ab, the threshold value B is continuously used and if the average value r is less than the setting value bc, the threshold value B is lowered to the threshold value C. When a setting value corresponding to the threshold value C is the setting value cd and the threshold value C is applied, if the average value r in the latest predetermined period ta is greater than or equal to the setting value cd and less than the setting value bc, the threshold value C is continuously used and if the average value r is less than the setting value cd, the threshold value C is lowered to the threshold value D.

In other words, in this embodiment, the controller 40 lowers the threshold value (that is, increases the detection sensitivity) when the difference between the average value r and the threshold value increases, and the controller 40 raises the threshold value (that is, decreases the detection sensitivity) when the difference between the average value r and the threshold value decreases. This processing enables the apparatus to optimize the threshold value to a value appropriate for the document P actually being transported and the use environment of the apparatus, thus enabling more appropriate abnormal condition (jam) determination.

It is to be understood that the above-described embodiment is a mere example, and any methods may be used as long as a threshold value is lowered if a difference between the threshold value and a detection value is greater than or equal to a predetermined value and the threshold value is raised if a difference between the threshold value and a detection value is less than a predetermined value. In the above-described embodiment, the average value r in a predetermined period to is a simple average; alternatively, a weighted average that reduces a weight for past values and increases a weight for a latest value may be used. Instead of an average value, a maximum value may be used or several values may be extracted from maximum values and the average value of the extracted maximum values may be used.

The predetermined period ta may be defined by the number of transport operations or by time. If a power-on operation is included in the predetermined time ta, a detection value before the power-on operation may be discarded.

The predetermined period ta may be set to be long if variations (for example, standard deviation) of detection values are large and may be set to be short if variations are small. In other words, when variations of detection values are small, for example, documents P of the same type or size are continuously used. In such a case, the predetermined time ta is set to be short such that the average value r sufficiently reflects the latest apparatus usage condition. By setting a threshold value with the average value r, appropriate detection sensitivity can be achieved and thus the reliability of the abnormal condition (jam) determination can be increased.

On the other hand, when variations of detection values are large, documents P of different types or sizes or documents P having folds or wrinkles can be mixed. In such a case, the predetermined time ta is set to be long such that the average value r is less affected by an outlier. By setting a threshold value with the average value r, appropriate detection sensitivity can be achieved and thus the reliability of the abnormal condition (jam) determination can be increased. A longer predetermined period to enables the apparatus to reflect the overall tendency of used documents P and the individual difference of the apparatus, and thus appropriate detection sensitivity can be achieved in terms of this point.

In the threshold optimization, information about whether a jam determination result is true or false may be added, that is, information about whether a jam determination result is true or false may be added to history information. For this purpose, when a detection value is higher than a threshold value and it is determined that an abnormal condition (jam) has occurred in the document transport path T, the controller 40 provides, on the operation panel 7 (FIG. 1 and FIG. 3) that serves as the display section, a user interface (hereinafter, referred to as a determination check UI) for urging a user to check whether the determination is true or false and acquires the information about whether the determination is true or false. The program 44 that is stored in the ROM 42 (FIG. 3) implements such a function.

The determination check UI may be a UI for providing a message and three options from which an option is to be selected by a user. For example, when a detection value is higher than a threshold value and the controller 40 determines that a jam has occurred and stops the document transport processing, the determination check UI may display a message "A document jam has been detected. Check the document jam condition and select a process to be performed." and three options such as "A document jam has occurred and the jam has been solved. Resume the reading process.", "A document jam has occurred. Stop the reading process." and "No document jam has occurred. Resume the reading process." for a user to select one of the three options. With such a user interface, the controller 40 can perform the process selected by the user and acquire the information about whether the jam determination is true or false (misdetection).

The information about whether a jam determination is true or false (misdetection) acquired in such a way can be used as described below. For example, the controller 40 does not add a detection value to history information when a jam determination is true. Specifically, the detection value acquired when the jam determination is true can be considered to be an outlier when an abnormal condition (jam) has occurred, and if such a value is included in the history information, the value may not be an appropriate threshold value for the document P actually being transported. Consequently, the controller 40 does not add the detection value acquired when the jam determination is true to the history information and thereby the threshold value can be more appropriately optimized, resulting in more appropriate abnormal condition determination.

Furthermore, the controller 40 stores the detection values acquired when the jam determination were true and a minimum value of the detection values may be set as a lower limit value for a threshold value to be set. This operation can reduce the occurrence of misdetection due to a threshold value that is too low (the sensitivity is too high).

Furthermore, when the controller 40 has determined that a jam has occurred two consecutive times, the controller 40 may not provide the above-described determination check UI when determining a jam occurrence first and may provide the determination check UI when determining a jam occurrence next time. Specifically, if the controller 40 determines that a jam has occurred two consecutive times, the determinations are probably false, whereas, if the controller 40 determined that a jam occurred, and before the determination, did not determined that a jam occurred, and after the determination, does not determine that a jam has occurred, these determinations are probably true. Accordingly, in determining an occurrence of a jam two consecutive times, when the controller 40 determines that a jam has occurred first, the controller 40 does not provide the above-described determination check UI on the operation panel 7 and when determining that a jam has occurred second, the controller 40 provides the above-described determination check UI on the operation panel 7, thus reducing unnecessary check by the user when the jam occurred first.

Threshold Optimization Method 2

Figure 9:
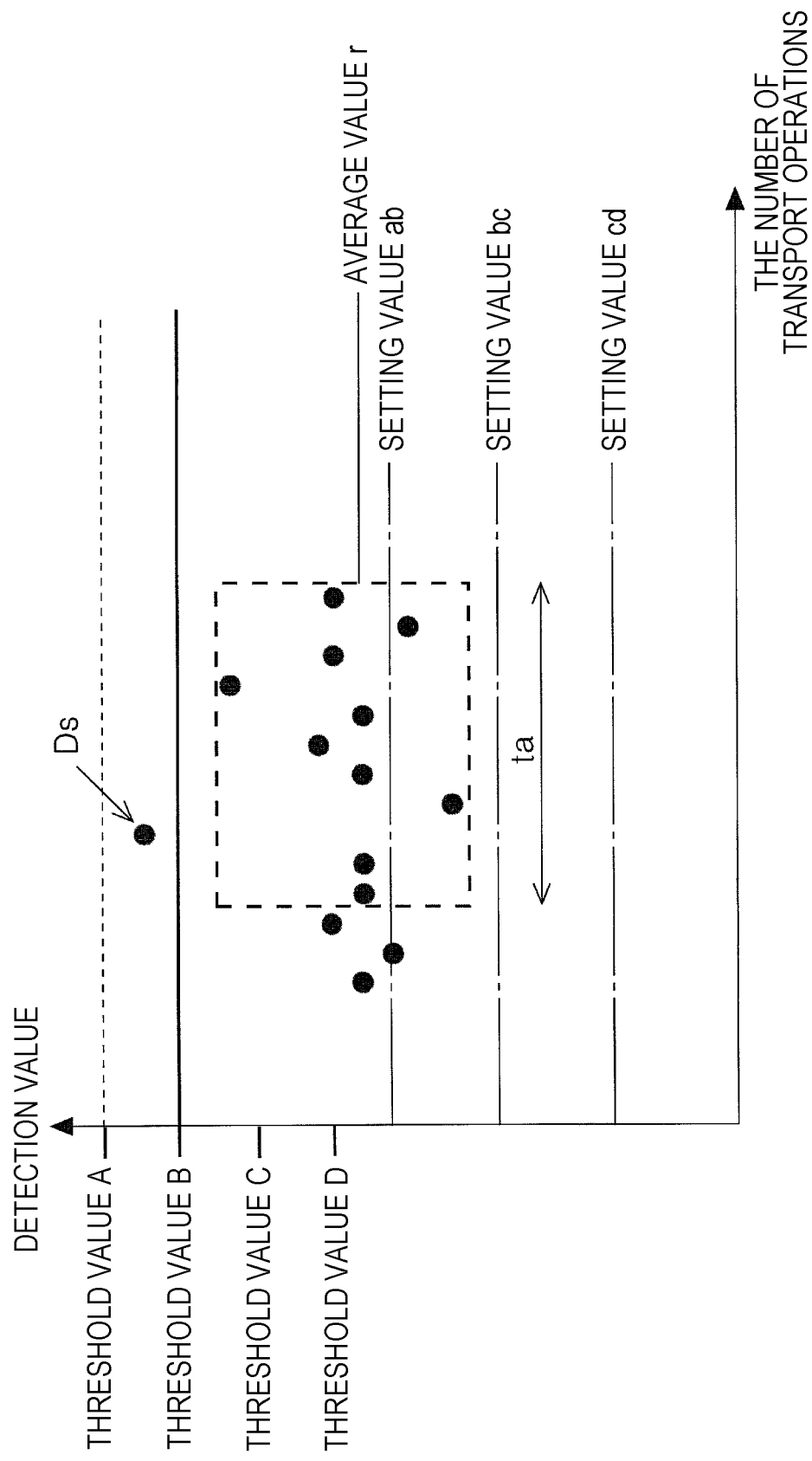
FIG. 9 is a plot of values detected by a threshold optimization method according to a second embodiment.

FIG. 9 is a plot of detection values according to a method of optimizing a threshold value based on history information including information about a detection value acquired in the past according to a second embodiment. In this embodiment, the basic idea of the threshold optimization method is similar to that described with reference to FIG. 6 and FIG. 7. This embodiment includes information about whether a jam determination is true or false in the history information. For example, when a detection value is higher than a threshold value, the information about whether the detection value is a result of a detection when a jam has actually occurred or a result of a misdetection is stored in the memory 43. The controller 40 may not use a value that is higher than the detection value acquired when the jam determination is true as a threshold value.

FIG. 9 illustrates the example, and in this drawing, it is assumed that the threshold value B is initially applied. During document transport with the threshold value B, when an average value r of detection values in a latest predetermined period to exceeds the setting value ab, in the embodiment described with reference to FIG. 6 and FIG. 7, the threshold value to be applied is raised from the threshold value B to the threshold value A. However, a detection value Ds exists above the threshold value B, which is not a misdetection value and acquired when a jam actually occurred. Accordingly, if the threshold value A that is higher than the detection value Ds is applied, a detection value the same as or near the detection value Ds is not determined as a jam in the subsequent detection, that is, a jam is not detected even though a jam has actually occurred. To solve the problem, the controller 40 does not use a value that is greater than or equal to the detection value Ds acquired when the jam determination is true as a threshold value. This method can prevent or reduce the above-described erroneous determinations.

Threshold Optimization Method 3

Figure 10:
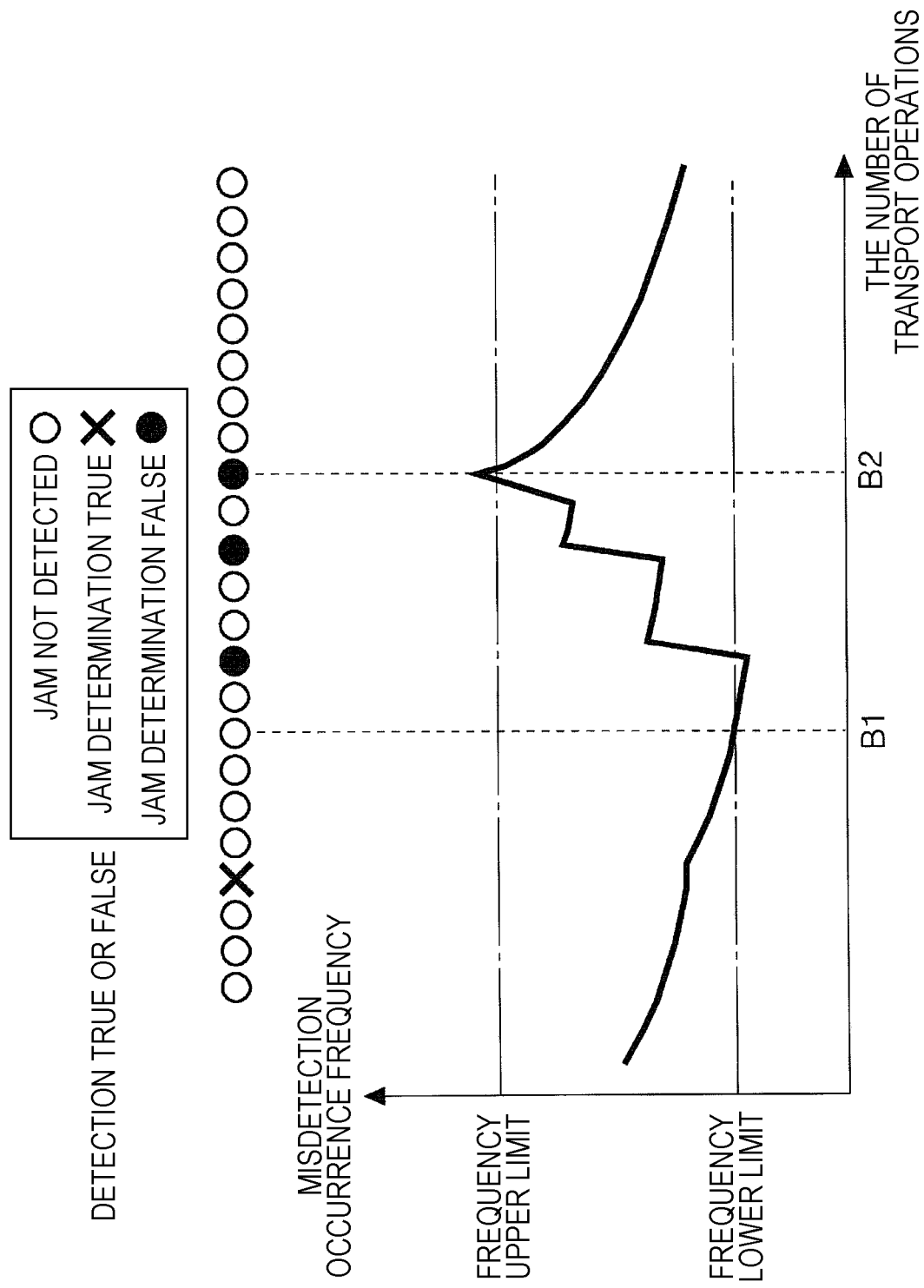
FIG. 10 is a graph illustrating a frequency of occurrence of misdetection in a threshold optimization method according to a third embodiment.
Figure 11:
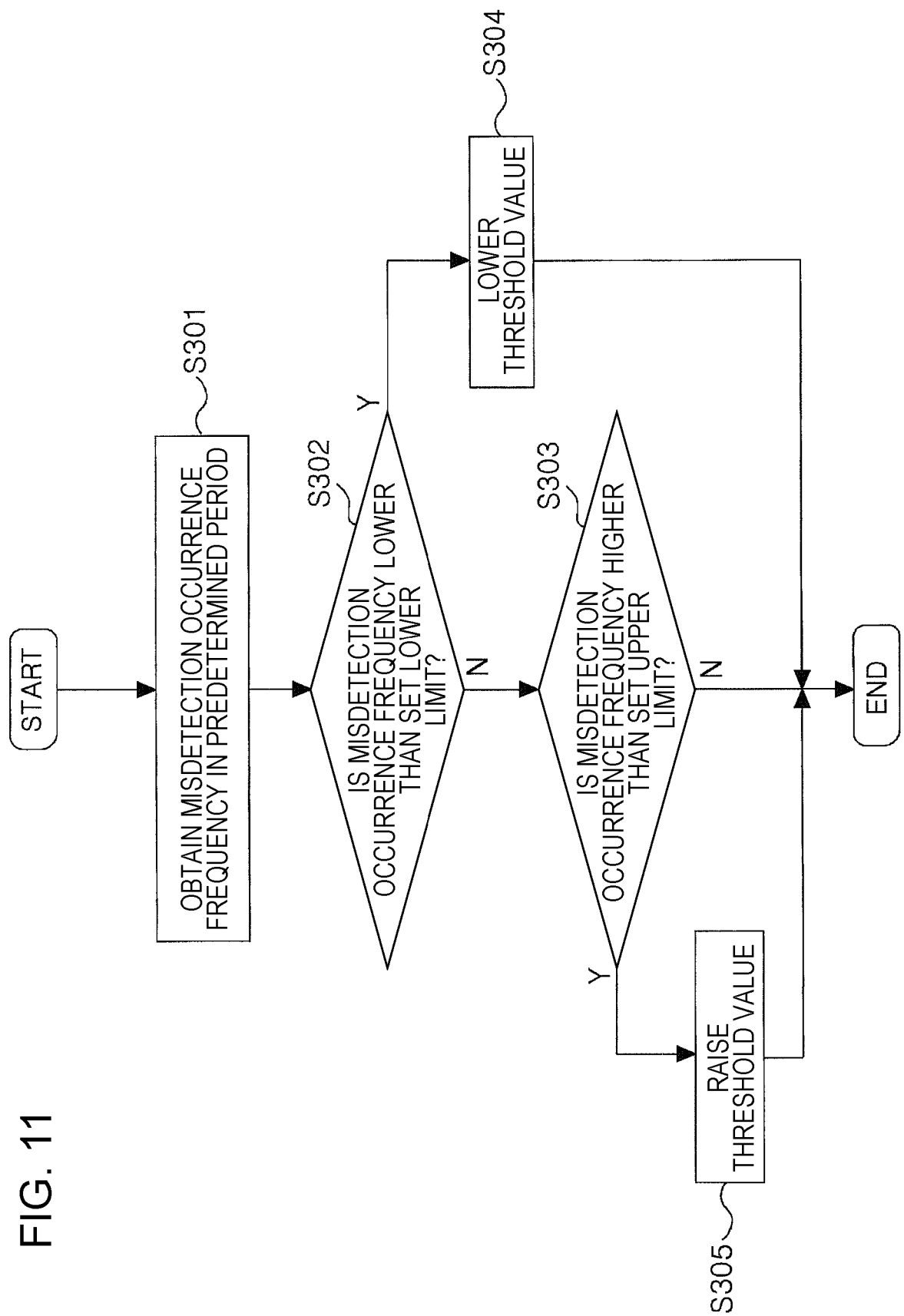
FIG. 11 is a flowchart illustrating an outline of the threshold optimization method according to the third embodiment.

FIG. 10 is a graph illustrating a frequency of occurrence of misdetection in a method of optimizing a threshold value based on history information including information about a detection value acquired in the past according to a third embodiment. FIG. 11 is a flowchart of the method. The threshold optimization method according to the embodiment first obtains a misdetection occurrence frequency in a predetermined period as illustrated in FIG. 11 (step S301). If the misdetection occurrence frequency is lower than a set lower limit (YES in step S302), the detection sensitivity is raised, that is, the threshold value is lowered (step S304). On the other hand, if the misdetection occurrence frequency is higher than a set upper limit (YES in step S303), the detection sensitivity is lowered, that is, the threshold value is raised (step S305). If the misdetection occurrence frequency is not lower than the set lower limit (NO in step S302) and the misdetection occurrence frequency is not higher than the set upper limit (NO in step S303), the detection sensitivity is maintained (the threshold value is not changed). Hereinafter, the processing is described in detail with reference to FIG. 10.

Different from the plots illustrated in FIG. 6 and other drawings, in the graph in FIG. 10, the vertical axis indicates a frequency (hereinafter, referred to as a misdetection occurrence frequency) of occurrence of false jam determinations. The misdetection occurrence frequency decreases as the number of transport operations increases without misdetection, and increases if misdetection occurs. In an upper part of FIG. 10 above the graph illustrating an example of the transition of misdetection occurrence frequency, example results of true or false in the detections are shown. A hollow circle indicates that the detection value was lower than a threshold value (no jam was detected), a cross mark indicates that the detection value was higher than a threshold value and it was determined that a jam occurred, and the result was true (a jam actually occurred), and a filled circle indicates that the detection value was higher than a threshold value and it was determined that a jam occurred, but the result was false (a jam did not actually occur, that is, misdetection).

The misdetection occurrence frequency has a preset frequency upper limit and a preset frequency lower limit. The frequency upper limit and the frequency lower limit are stored in the memory 43, which is an example storage. In this embodiment, history information includes information (information about detection values) about true or false of jam determinations and a threshold value that is currently being applied, and information necessary for threshold optimization includes a misdetection occurrence frequency, a frequency upper limit, a frequency lower limit, and a coefficient for determining a threshold value. The misdetection occurrence frequency is obtained from information about jam determination true or false in a predetermined period (latest predetermined period). For example, if misdetection (jam determination false) occurs five times in the latest transport of 100 sheets of documents, the misdetection occurrence frequency is 5%. In the subsequent transport of documents P, if a jam-non-detection condition continues, the misdetection occurrence frequency eventually becomes lower than the frequency lower limit. In FIG. 9, as an example, the misdetection occurrence frequency reaches the frequency lower limit at a timing B1. After the misdetection occurrence frequency has reached the frequency lower limit, the controller 40 lowers the threshold value for jam determination (raises the detection sensitivity). In other words, the low misdetection occurrence frequency means that the threshold value has too much margin for the detection value. Accordingly, the controller 40 determines whether a latest detection value has a margin with respect to the threshold value from the misdetection occurrence frequency, and if the controller 40 determines that there is a margin, the controller 40 lowers the threshold value. In other words, the controller 40 optimizes the threshold value based on the history information including the information about the detection value acquired in the past. A new threshold value can be obtained, for example, by multiplying a currently applied threshold value by a predetermined coefficient. For example, to lower a threshold value, the threshold value is multiplied by a coefficient (for example, 0.8) smaller than 1, and to raise a threshold value, the threshold value is multiplied by a coefficient (for example, 1.2) larger than 1. It should be noted that this method is a mere example, and various threshold value adjustment methods can be used.

At the timing B1, since the misdetection occurrence frequency has reached the frequency lower limit, the threshold value is lowered (the detection sensitivity is raised), and then, misdetection occurs and the misdetection occurrence frequency increases, and eventually the misdetection occurrence frequency reaches the frequency upper limit. In FIG. 9, as an example, the misdetection occurrence frequency exceeds the frequency upper limit at a timing B2. After the misdetection occurrence frequency has reached the frequency upper limit, the controller 40 raises the threshold value for jam determination (lowers the detection sensitivity). In other words, a high misdetection occurrence frequency means that the threshold value has no margin for the detection value. Accordingly, the controller 40 determines whether a latest detection value has a margin with respect to the threshold value from the misdetection occurrence frequency, and if the controller 40 determines that there is no margin, raises the threshold value. In other words, the controller 40 optimizes the threshold value based on the history information including the information (the information about true or false of the jam determination) about the detection value acquired in the past.

In this embodiment, it is preferable that, when the misdetection occurrence frequency becomes greater than or equal to a frequency upper limit, the controller 40 set the threshold value set at that time as a minimum threshold value (that is, a maximum sensitivity) and in the subsequent processing, do not set a threshold value less than or equal to the minimum threshold value. In other words, a state the misdetection occurrence frequency becomes greater than or equal to a frequency upper limit means that misdetection occurs many times as described above and the threshold value being applied is too low (the detection sensitivity is too high). In such a case, if the threshold value is used again, misdetection may occur many times again. To solve the problem, when the misdetection occurrence frequency becomes greater than or equal to a set frequency upper limit, the controller 40 sets the threshold value as a minimum threshold value and in the subsequent processing, sets no threshold value that is less than or equal to the minimum threshold value to prevent frequent misdetection.

When the misdetection occurrence frequency does not become lower than a predetermined allowable frequency even though a minimum threshold value like the above-described minimum threshold value has been used as the threshold value, it is also preferable that the controller 40 do not perform the jam determination. When the misdetection occurrence frequency does not become lower than a predetermined allowable frequency (for example, the frequency upper limit in FIG. 9) even though a minimum threshold value like the above-described minimum threshold value has been used as the threshold value, it can be determined that some kind of abnormal condition has occurred in the sound detector 33. In such a case, the controller 40 does not perform the jam determination to enable the apparatus to continue the operation. The selection to perform the jam determination or not may be conducted by a user. In such a case, a user interface for urging a user to select to perform the jam determination or not is provided on the operation panel 7 (FIG. 1). For example, a message "The jam detection sensor is probably in an abnormal condition. Turn off the jam detection function? (Y/N)" may be provided.

Threshold Optimization Method 4

Figure 12:
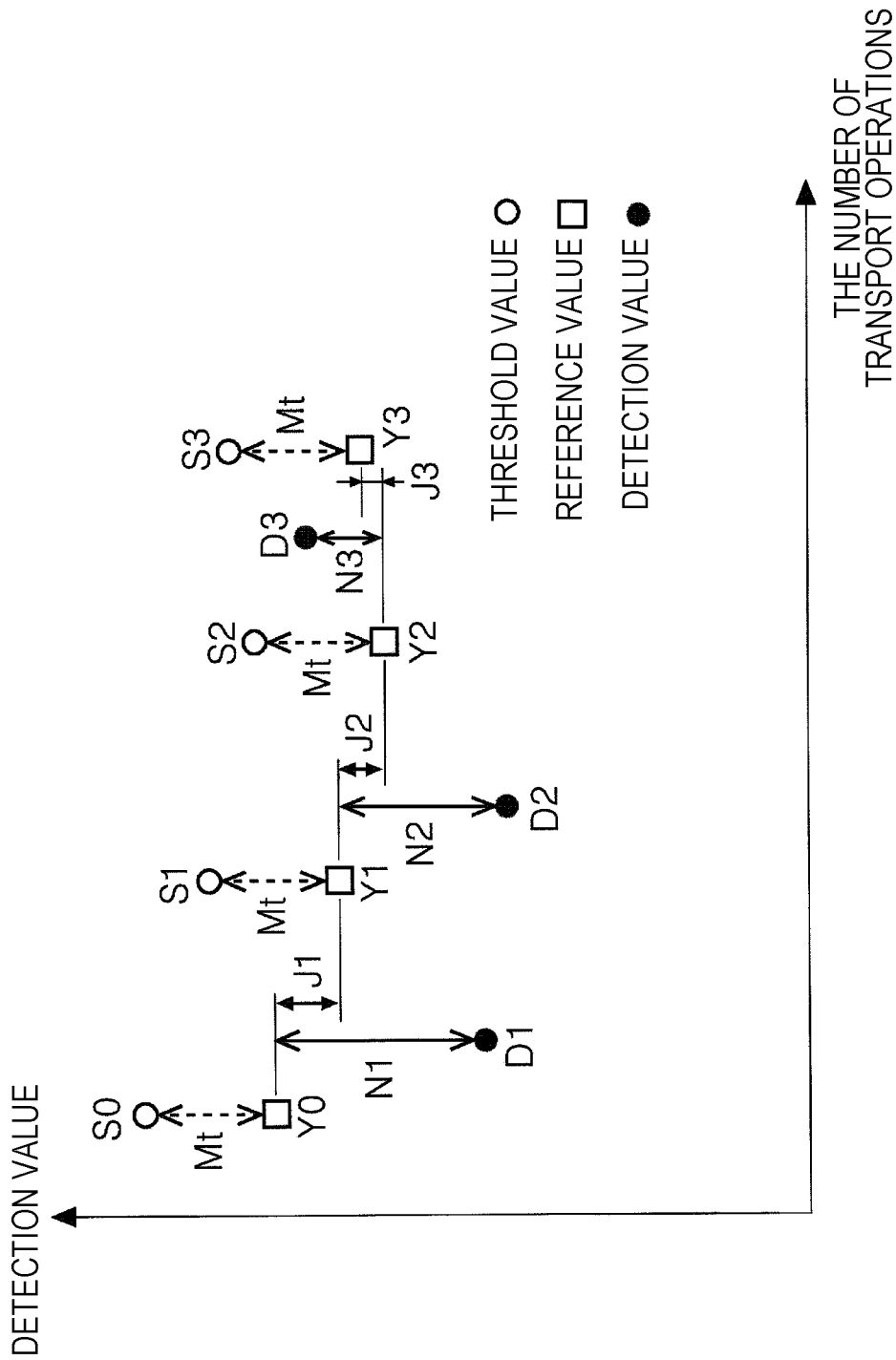
FIG. 12 is a plot of values detected by a threshold optimization method according to a fourth embodiment.
Figure 13:
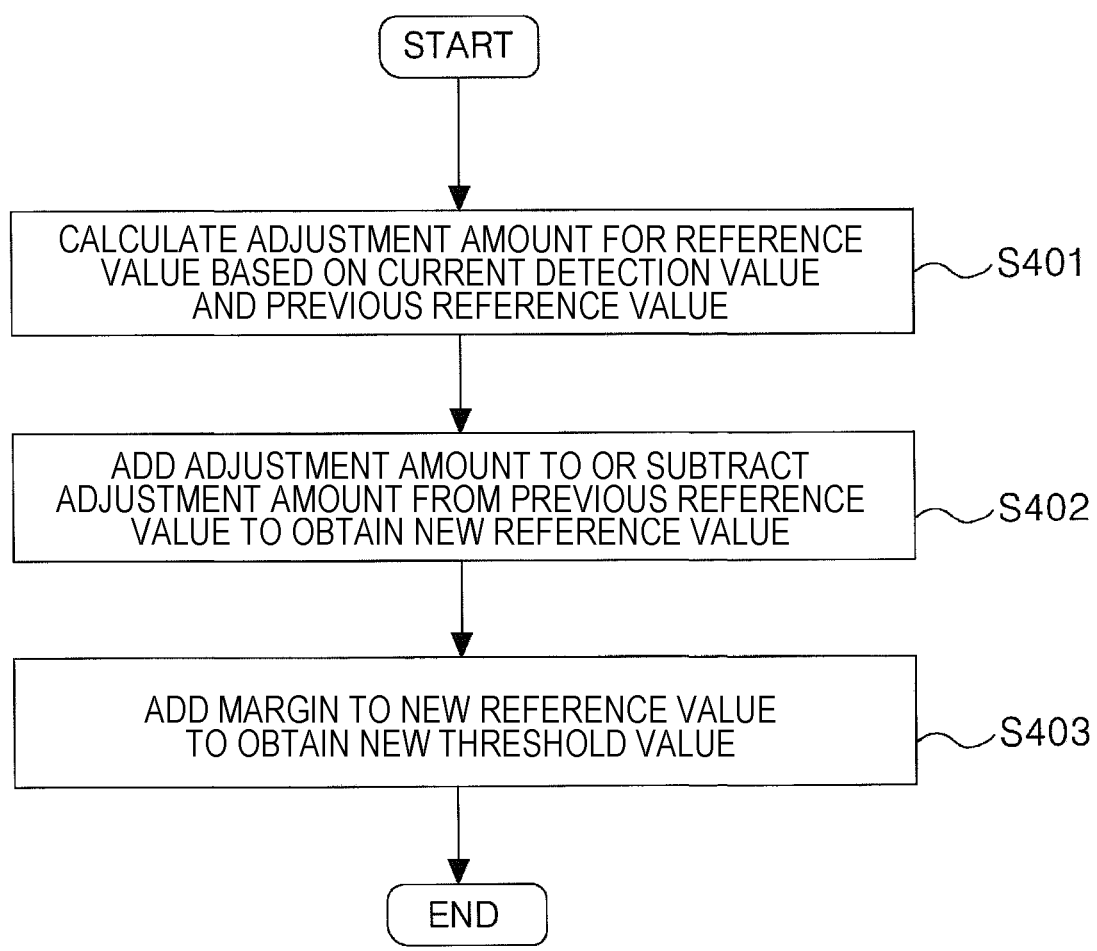
FIG. 13 is a flowchart illustrating an outline of the threshold optimization method according to the fourth embodiment.

FIG. 12 is a plot of detection values according to a method of optimizing a threshold value based on history information including information about a detection value acquired in the past according to a fourth embodiment. FIG. 13 is a flowchart of the method. As illustrated in FIG. 13, the threshold optimization method according to the embodiment first calculates an adjustment amount based on a current detection value and a previous reference value (step S401), and adds the adjustment amount to or subtracts the adjustment amount from the reference value to obtain a new reference value (step S402). Then, to the new reference value, a predetermined margin value is added to obtain a new threshold value (step S403). In this embodiment, when a currently detected value is smaller than a previous reference value, the reference value is lowered, resulting in a lower threshold value to be applied next time (detection sensitivity is raised), and when a currently detected value is larger than a previous reference value, a new reference value is raised, resulting in a higher threshold value to be applied next time (detection sensitivity is lowered). Hereinafter, the processing is described in detail with reference to FIG. 12.

In FIG. 12, filled circles (indicated by reference numerals D1 to D3) are plots of detection values, hollow circles (indicated by reference numerals S0 to S3) are plots of applied threshold values, and hollow square marks (indicated by reference numerals Y0 to Y3) are plots of reference values. A reference numeral Mt denotes a predetermined margin value, each of reference numerals N1 to N3 denotes a difference between a reference value and a detection value, and reference numerals J1 to J3 denote predetermined percentage values (correspond to the above-described adjustment amount) for the reference numerals N1 to N3 respectively. Preferably, the percentage value is a value less than or equal to 20% of a difference between a reference value and a detection value, and in this embodiment, a value from 5% to 10% is set. In this embodiment, the history information includes a latest detection value and a latest reference value, and the information necessary for threshold optimization includes a margin value Mt and a coefficient for calculating a percentage value.

The reference values Y0 to Y3 and the threshold values S0 to S3 in FIG. 12 are updated each time based on the detection values. For example, a factory default reference value can be set by subtracting the margin value Mt from a default threshold value, or may be zero. The threshold value is obtained by adding the margin value Mt to a reference value. In other words, a reference value is obtained by subtracting the margin value Mt from a threshold value. For example, in FIG. 12, the controller 40 calculates a percentage value J1 for a difference N1 between a currently acquired detection value D1 and a latest reference value Y0 and subtracts the percentage value J1 from the latest reference value Y0 to obtain a new reference value Y1. The percentage value J1 is subtracted from the reference value Y0 because the currently acquired detection value D1 is less than or equal to the reference value Y0.

Then, the controller 40 adds the predetermined margin value Mt to the new reference value Y1 to obtain a new threshold value S1. The subsequent processing based on a next acquired detection value D2 is similarly performed. In this processing, however, since a detection value D3 exceeds a latest reference value Y2, a percentage value J3 is added to the latest reference value Y2 to obtain a new reference value Y3. In the above-described examples, reference values and detection values are different values; however, if the reference values and the detection values are the same, percentage values (adjustment values) are zero, and the reference values are not changed. This processing can adjust the threshold value for jam determination to values appropriate for the document actually being transported and the use environment, thus enabling more appropriate jam determination.

Other Modifications

The above-described embodiments can be modified as described below.

1. The controller 40 may reset history information by an instruction from a user or if a predetermined condition is satisfied. For example, by resetting history information when a use environment is changed, more appropriate jam determination can be performed. It should be noted that both of the resetting of the history information by an instruction from a user and the resetting of the history information when a predetermined condition is satisfied may be performed.

When the resetting is performed by an instruction issued by a user, for example, a user interface for receiving the instruction for resetting the history information may be provided on the operation panel 7 (FIG. 1). The predetermined conditions include, for example, when a series of reading jobs are completed, when information (for example, a document size, a document type, an apparatus user, or the like) that can be set on the operation panel 7 is changed, when a predetermined time has passed since the completion of a previous job, when the predetermined number of sheets of documents have been transported since the completion of a previous job, and when the power is turned on.

The history information includes a detection value in the past, and by resetting the history information, the detection value in the past is erased or the detection value is not used even if the detection value remains as data. In such a case, a threshold value to be used for a next job may be a latest optimized threshold value or a default value. The default value may be one or may be set for each information such as a document size and a document type that can be set on the operation panel 7.

The number of detection values in the past becomes zero by resetting the history information and the number of data is small for a while. Until the number of data reaches a certain amount, all detection values obtained after the resetting may be used as the history information and after the number of data reaches the certain amount, the predetermined number of latest detection values may be used for the history information.

2. The controller 40 may have the history information including information about a detection value acquired in the past for each information such as a document size, a document type, and an apparatus user that can be set on the operation panel 7. In other words, in performing a reading job under the same or similar conditions, the reading job can be quickly and appropriately processed by enabling the apparatus to use corresponding history information. Furthermore, by transferring the history information to another apparatus to enable the apparatus to use the history information, the convenience in performing the reading job under the same or similar conditions can be further increased. For example, the history information is stored in a server on a network or a scanner that serves as a host and the history information may be downloaded from another apparatus connected to the network.

3. In the above-described embodiments, a threshold value for jam determination is changed based on the intensity (detection value) of a sound detected by the sound detector 33 in the document transport path T. In some embodiments, however, a detection value may be evaluated based on a threshold value to enable the apparatus to use the information to determine whether a certain event has occurred. For example, this method can be used in a case in which a driving current for the feeding-roller motor 45 (FIG. 3) or the transport-roller motor 46 (FIG. 3) is used as a detection value and when the detection value exceeds a threshold value, it is determined that a jam has occurred.

4. In the above-described embodiments, the scanner that is an example image reading apparatus is used as an example medium transport apparatus according to the invention. Alternatively, the embodiments may be applied to a recording apparatus that has a recording head for performing recording on a medium such as a printer.

5. In the above-described embodiments, the scanner that is an example image reading apparatus is used as an example medium transport apparatus according to the invention. Alternatively, the embodiments may be applied to a recording apparatus that has a scanner.

The entire disclosure of Japanese Patent Application No. 2018-027870, filed Feb. 20, 2018 is expressly incorporated by reference herein.

What is claimed is:

1. A medium transport apparatus comprising:
   a medium transport path through which a medium passes;
   a path state detection section configured to output a detection value corresponding to a state of the medium transport path;
   a control section configured to compare the detection value output by the path state detection section with a threshold value for the detection value and determine whether an abnormal condition has occurred in the medium transport path, wherein the abnormal condition comprises at least one of jamming or skewing of the medium;
   a storage configured to store history information including the detection value acquired in the past; and
   a display section configured to display information,
   wherein the control section changes the threshold value based on the history information, and
   wherein, when the detection value is higher than the threshold value and the control section determines that an abnormal condition has occurred in the medium transport path, the control section causes the display section to display a user interface for urging a user to check whether the determination is true or false and acquires the information about whether the determination is true or false.

2. The medium transport apparatus according to claim 1, wherein the control section does not include the detection value acquired when the determination is true in the history information.

3. The medium transport apparatus according to claim 1, wherein the history information includes the information about whether the determination is true or false and the control section does not use a value that is greater than or equal to the detection value acquired when the determination is true as the threshold value.

4. The medium transport apparatus according to claim 1, wherein the history information includes the information about whether the determination is true or false,
   the control section calculates a frequency of occurrence of the false determinations, and
   when the occurrence frequency is less than or equal to a set lower limit, the control section lowers the threshold value and when the occurrence frequency is greater than or equal to a set upper limit, the control section raises the threshold value.

5. The medium transport apparatus according to claim 4, wherein when the occurrence frequency is greater than or equal to the set upper limit, the control section sets the threshold value as a minimum threshold value and does not set a threshold value less than or equal to the minimum threshold value in the subsequent processing.

6. The medium transport apparatus according to claim 5, wherein when the occurrence frequency is not lower than a preset allowable frequency even though the minimum threshold value has been set as the threshold value, the control section does not perform the operation for determining whether an abnormal condition has occurred.

7. The medium transport apparatus according to claim 1, wherein when the control section determines that an abnormal condition has occurred two consecutive times, in the first determination of an occurrence of an abnormal condition, the control section does not display the user interface on the display section and in the second determination of an occurrence of an abnormal condition, the control section provides the user interface on the display section.

8. The medium transport apparatus according to claim 1, wherein the storage stores a reference value that is to be updated,
   when the acquired detection value is less than or equal to the reference value, the control section subtracts a predetermined percentage of a difference between the acquired detection value and the reference value from the reference value to obtain a new reference value and adds a predetermined margin value to the reference value to obtain the threshold value, and
   when the acquired detection value is higher than the reference value, the control section adds the predetermined percentage of the difference between the acquired detection value and the reference value to the reference value to obtain a new reference value and adds the margin value to the reference value to obtain the threshold value.

9. The medium transport apparatus according to claim 1, wherein the control section resets the history information in accordance with an instruction by a user or when a predetermined condition is satisfied.

10. The medium transport apparatus according to claim 1, wherein the path state detection section detects a change in a sound in the medium transport path and the detection value indicates the intensity of the sound, and when the detection value is higher than the threshold value, the control section determines that a jam as the abnormal condition has occurred.

11. A medium transport apparatus comprising:
a medium transport path through which a medium passes;
a path state detection section configured to output a detection value corresponding to a state of the medium transport path;
a control section configured to compare the detection value output by the path state detection section with a threshold value for the detection value and determine whether an abnormal condition has occurred in the medium transport path, wherein the abnormal condition comprises at least one of jamming or skewing of the medium; and
a storage configured to store history information including the detection value acquired in the past,
wherein the control section changes the threshold value based on the history information,
wherein the storage stores a predetermined setting value, and
when an average value of a plurality of the detection values acquired in the past is smaller than the predetermined setting value, the control section lowers the threshold value, and when the average value is larger than the predetermined setting value, the control section raises the threshold value.

12. An image reading apparatus comprising:
a reading section configured to read a medium; and
the medium transport apparatus according to claim 1, the medium transport apparatus being configured to transport the medium to the reading section.

13. An image reading apparatus comprising:
a reading section configured to read a medium; and
the medium transport apparatus according to claim 2, the medium transport apparatus being configured to transport the medium to the reading section.

14. An image reading apparatus comprising:
a reading section configured to read a medium; and
the medium transport apparatus according to claim 3, the medium transport apparatus being configured to transport the medium to the reading section.

15. An image reading apparatus comprising:
a reading section configured to read a medium; and
the medium transport apparatus according to claim 4, the medium transport apparatus being configured to transport the medium to the reading section.

16. An image reading apparatus comprising:
a reading section configured to read a medium; and
the medium transport apparatus according to claim 5, the medium transport apparatus being configured to transport the medium to the reading section.

17. An image reading apparatus comprising:
a reading section configured to read a medium; and
the medium transport apparatus according to claim 6, the medium transport apparatus being configured to transport the medium to the reading section.

18. A method of controlling a threshold value in a medium transport apparatus comprising a medium transport path through which a medium passes;
a path state detection section configured to output a detection value corresponding to a state of the medium transport path;
a control section configured to compare the detection value output by the path state detection section with a threshold value for the detection value and determine whether an abnormal condition has occurred in the medium transport path, wherein the abnormal condition comprises one of jamming or skewing of the medium;
a storage configured to store history information including the detection value acquired in the past; and
a display section configured to display information,
the method comprising:
changing the threshold value based on the history information,
wherein, when the detection value is higher than the threshold value and the control section determines that an abnormal condition has occurred in the medium transport path, the control section causes the display section to display a user interface for urging a user to check whether the determination is true or false and acquires the information about whether the determination is true or false.

* * * * *